United States Patent [19]

Weisleder

[11] Patent Number: 5,437,493

[45] Date of Patent: Aug. 1, 1995

[54] COLLAPSIBLE STROLLER TRAY

[76] Inventor: Toni Weisleder, 1739 Certainty Dr., Point Pleasant, N.J. 08742

[21] Appl. No.: 95,097

[22] Filed: Jul. 20, 1993

[51] Int. Cl.$^6$ .............................................. A47B 49/00
[52] U.S. Cl. ..................................... 297/150; 297/153
[58] Field of Search ........................... 108/42, 90, 65; 297/119, 120, 122, 127, 130, 143, 145, 149, 150, 151, 153, 154, 155, 160–162; 280/644, 658, 650

[56] References Cited

U.S. PATENT DOCUMENTS

| D. 305,522 | 1/1990 | Kohus et al. | D12/133 |
|---|---|---|---|
| 2,146,137 | 2/1939 | Goldenson | 155/127 |
| 2,175,572 | 10/1939 | Ruhl | 311/106 |
| 2,452,183 | 10/1948 | Clawson | 297/161 |
| 2,666,241 | 1/1954 | Hall | 24/573.7 |
| 2,804,738 | 3/1942 | Peltier | 155/22 |
| 2,825,611 | 3/1958 | Aynesworth | 311/21 |
| 2,976,912 | 3/1961 | Dias | 155/38 |
| 3,338,627 | 8/1967 | Frank | 297/153 |
| 3,512,829 | 5/1970 | Paris | 297/148 |
| 4,373,756 | 2/1983 | Purdy | 297/153 |
| 4,512,607 | 4/1985 | Rapp | 297/153 |
| 4,606,576 | 8/1986 | Jones | 297/153 |
| 4,693,187 | 9/1987 | Bising | 108/69 |
| 4,856,809 | 8/1989 | Kohus et al. | 280/644 |
| 4,946,180 | 8/1990 | Baer | 280/39 |
| 5,106,156 | 4/1992 | Marquis | 297/153 |
| 5,176,259 | 1/1993 | Andersen | 297/153 X |

OTHER PUBLICATIONS

"What's New" Catalog, Dec. 1992 Showing Activity Tray For Stroller.

Primary Examiner—Laurie K. Cranmer
Attorney, Agent, or Firm—Plevy & Associates

[57] ABSTRACT

A collapsible tray detachably securable to a baby stroller, the tray having two complimentary sections hingeably secured along their common edge so as to secure the tray in a planar orientation attached to the stroller, yet permitting the disengagement or folding of the complimentary sections for storage, each complimentary section having an adjustable securing clip for engagement with the tubular frame of the stroller.

16 Claims, 6 Drawing Sheets

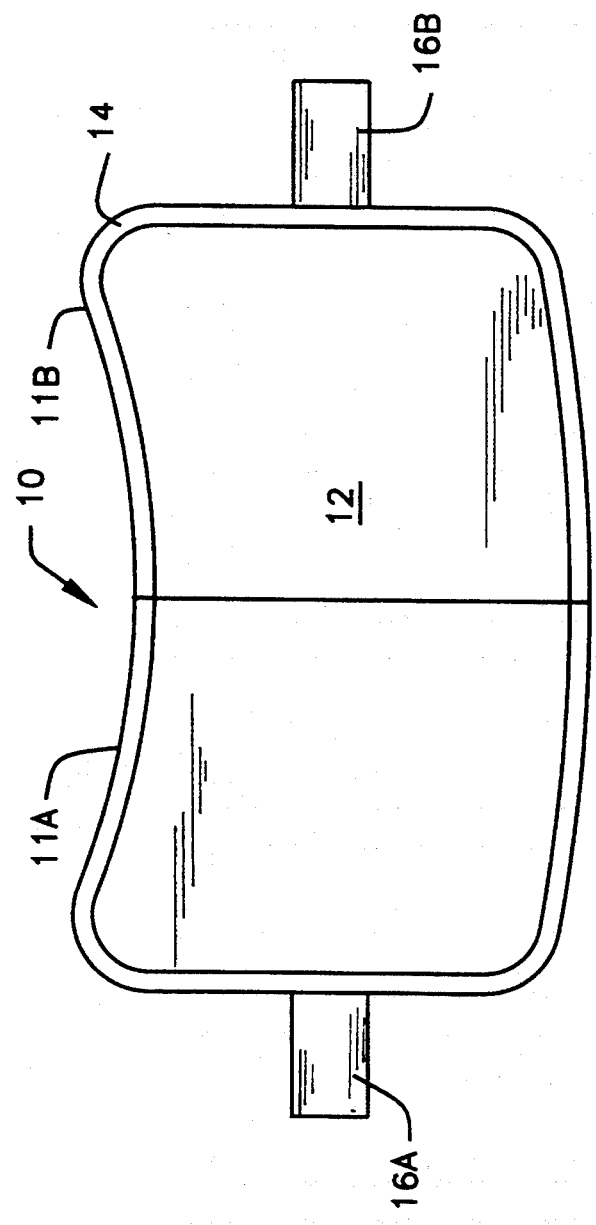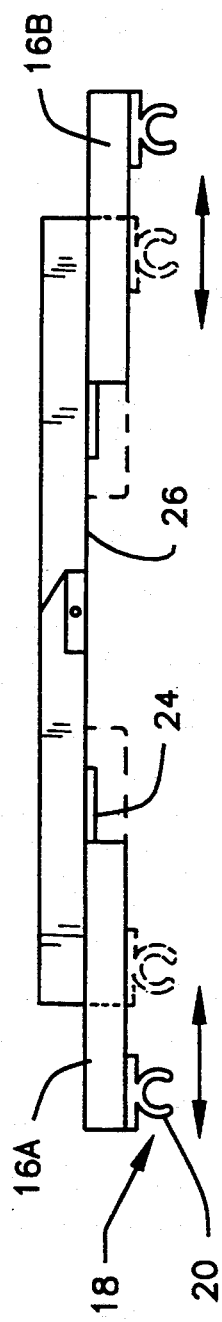
FIG. 2
FIG. 3

COLLAPSIBLE STROLLER TRAY

FIELD OF THE INVENTION

The present invention is directed towards a collapsible stroller tray which can be easily secured to a stroller when required and easily removed and folded for storage on the stroller or in a diaper bag or the like.

The present application is a substitute of Ser. No. 07/753,635 filed Aug. 30, 1991.

BACKGROUND OF THE INVENTION

Young children are most often transported by walking parents by means of a stroller in which the child is positioned in a sitting position and strapped into place to prevent the child from being dislodged. The stroller seat is normally large enough to support the child and to provide some means of padding and protection, be it pillows, blankets or the like. The child would be held in place normally by a strap across the waist or a combination of a waist strap and a strap between the child's legs.

Young children's feeding schedules often do not coincide with that of the parents, and thus parents frequently find themselves in a position where they must feed the child while they are away from the home and the child is positioned in the stroller. Many types of strollers provide for a feeding tray to be affixed thereto. Such feeding trays may, for example, be permanently affixed to the sidearms of the stroller and slidable relative thereto to facilitate the positioning of the child in the stroller and the removal of the child therefrom.

U.S. Pat. No. 2,976,912 to Dias is an example of a tray affixed to the sidearms of a stroller in a more or less permanent manner. Since the primary purpose of the tray is to accommodate feeding of the child while seated therein, it will be appreciated that the tray will usually not be needed between feedings. At these times, movements of the child's arms will be significantly constrained so that he or she may become somewhat uncomfortable. Moreover, covering or uncovering the child, or adding or removing clothing and the like is more difficult due to the presence of the tray. Accordingly, even where the tray is slidably positionable, there are situations where it can become a hindrance.

In an effort to overcome the aforementioned deficiency, detachable trays have been utilized in the prior art. See U.S. Pat. No. 2,276,792 to Peltier for an example of a stroller having a tray which is detachably securable to the stroller. While the Peltier tray is removable, there is no convenient position for storage or for carrying the tray. In U.S. Pat. No. 4,946,180 to Baer, there is disclosed a variation on a child's safety seat which is also adapted to function as a high chair and a stroller. Described therein is a tray of two-piece construction which is adapted to serve as a restraining arm rest and to receive the safety plate of the harness for car seat use. The respective tray sections are pivotably secured to respective bight portions and are adapted to swing outwardly thereon into a coplanar orientation for use.

Kohus, in U.S. Pat. No. 4,856,809, discloses a collapsible stroller which incorporates a storable tray so that the stroller can maintain its collapsibility. In Kohus, the tray is rotatable about one of the support arms and is frictionally engageable with the other support arm. Thus, when not required, the tray is swung into a parallel position with one of the support arms and the stroller can be easily collapsed. The Kohus tray has limited application to the collapsible stroller because of the frame configuration of the collapsible stroller and the manner in which the tray is rotatably secured thereto.

It is therefore an object of the present invention to provide a light-weight tray which may be easily secured to any stroller having rails or other suitable support structure but which can also be readily removed therefrom and folded for compact storage.

It is a further object of the present invention to provide a foldable stroller tray which prevents the passage of liquids and other material therethrough while in use.

It is yet another object of the present invention to provide a tray which is be frictionally engageable with the side rails of a stroller and adjustable to correspond with varying stroller seat widths.

SUMMARY OF THE INVENTION

The present invention is directed to a collapsible tray which is laterally adjustable to accommodate strollers of different seat widths, the tray having a hinged means centrally positioned such that when the tray is positioned on the stroller, the tray is structurally supported and when the tray is removed therefrom, the stroller tray may be folded or the sections thereof otherwise separated to facilitate storage and handling.

BRIEF DESCRIPTION OF THE DRAWINGS

The foregoing and other objects, features, and advantages of the invention will be apparent from the following more particular description of preferred embodiments of the invention, as illustrated in the accompanying drawings, wherein

FIG. 2 is a plan view of one embodiment of a collapsible stroller tray in accordance with the present invention;

FIG. 3 is a front elevation view of the stroller tray depicted in FIG.2;

DETAILED DESCRIPTION OF THE DRAWINGS

Figure 1:
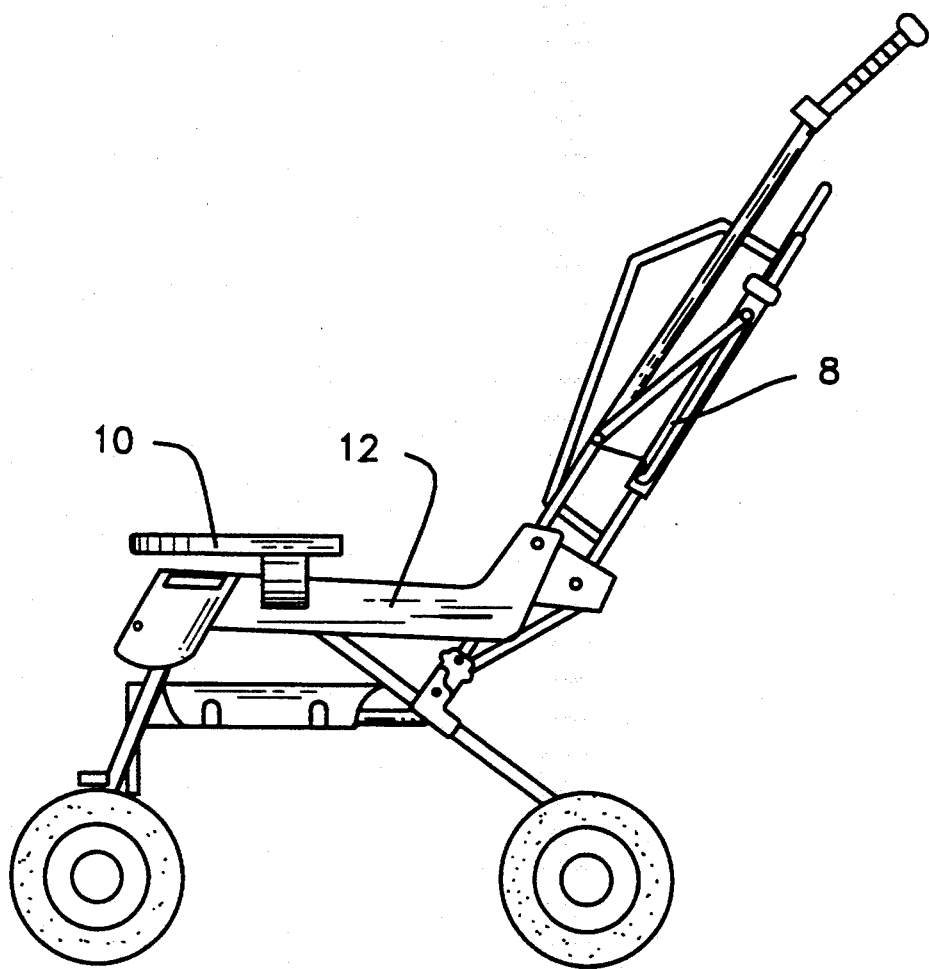
FIG. 1 is a side elevation view of a stroller having a collapsible tray secured thereto in accordance with the present invention.

Referring to FIG. 1, there is illustrated a side elevation view of a collapsible carriage or stroller 8 with the upholstery omitted therefrom for clarity. It will, of course, be appreciated by those of ordinary skill in the art that the stroller may be of any desired configuration so long as it includes suitable structure for securing the novel stroller tray 10 thereto. In the illustrative embodiment, the stroller includes a first side rail 12 and a second side rail (not shown), which side rails extend parallel to one another and substantially parallel to the ground or other underlying surface on which the stroller will be used. The collapsible tray 10 is secured to the side rails using suitable securing means which will be described later. It will of course be apparent to those of ordinary skill in the art that if the stroller includes a front rail interconnecting the side rails, the securing means may further be adapted to secure the collapsible tray 10 thereto.

With reference now to FIG. 2, it can be seen that the tray 10 has an arcuate recess portion for comfortably accommodating the child when the same is in use. It will, however, it will be recognized by those of ordinary skill in the art that the shape of the tray may be modified for aesthetic as opposed to functional considerations. Tray 10 is comprised of two complimentary sections 11A and 11B which define a generally planar platform 12. Complimentary sections 11A and 11B interconnect as described hereafter to define generally planar surface portion 12. In order to confine food and liquids to the aforementioned planar surface, the tray preferably includes a molded lip portion 14 about the circumference of thereof.

Means for securing tray 10 to stroller 8 in accordance with one embodiment of the present invention will now be described. With continuing reference to FIG. 2, there are shown adjustable positioning members 16A and 16B extending from a lateral side of tray sections 11A and 11B, respectively. As shown in FIG. 3, an adjustable clamp holder 18 is mounted on the distal end of each positioning member. In the illustrative embodiment, adjustable clamp holder 18 is comprised of a generally U-shaped, resilient member 20, which depends downwardly from clamp holder 18 and is engageable with one of the opposed side rails of the stroller. Each positioning member has a slotted surface (not shown) which permits it to be selectively slidably positioned over a clamp guide rail 24 secured to a lower surface portion 26 of each tray section, thereby permitting the clamp members to be moved laterally and thus facilitate mounting of tray 10 on strollers having different side rail spacings. The U-shaped resilient clamps 20 are frictionally engageable with the side rails to secure collapsible stroller tray 10 thereto.

Figure 7:
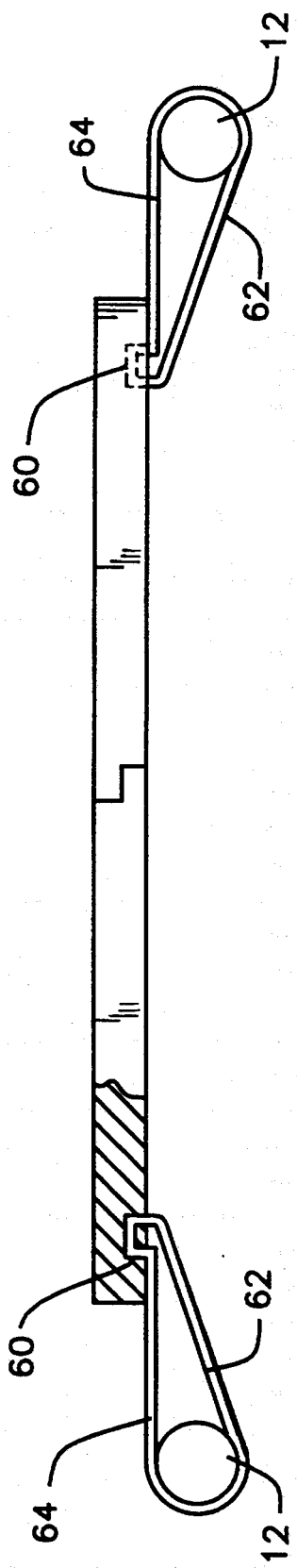
FIG. 7 is a front elevational view of the stroller tray according to a further embodiment of the present invention showing one end of the tray in partial cross-section.

It will, of course be understood by those of ordinary skill in the art that a wide variety of alternate securing means may be utilized to couple the collapsible tray 10 to a stroller. By way of example, the positioning member may have a pivotable, grooved latch attached to the proximal end thereof and the bottom of each tray section may be provided with a correspondingly grooved rack such that relative movement therebetween may be accomplished by pivoting the latch and sliding the positioning member. Alternatively, as shown in FIG. 7, the positioning member and clamp assembly may be omitted entirely and replaced with a series of straps 62, employing suitable fastening means such as buckles 64 or hook and loop fasteners. Such straps 62 could, for example, be inserted through slots 60 in the tray sections and be adapted to encircle any suitable rail structure 12 on the stroller. It will thus be understood that such equivalent structure which may be employed to providing selective sliding movement of the clamping means and locking with respect to the respective tray sections is indeed contemplated by the present invention and that such structure may be utilized without departing from the scope thereof.

Figure 4:
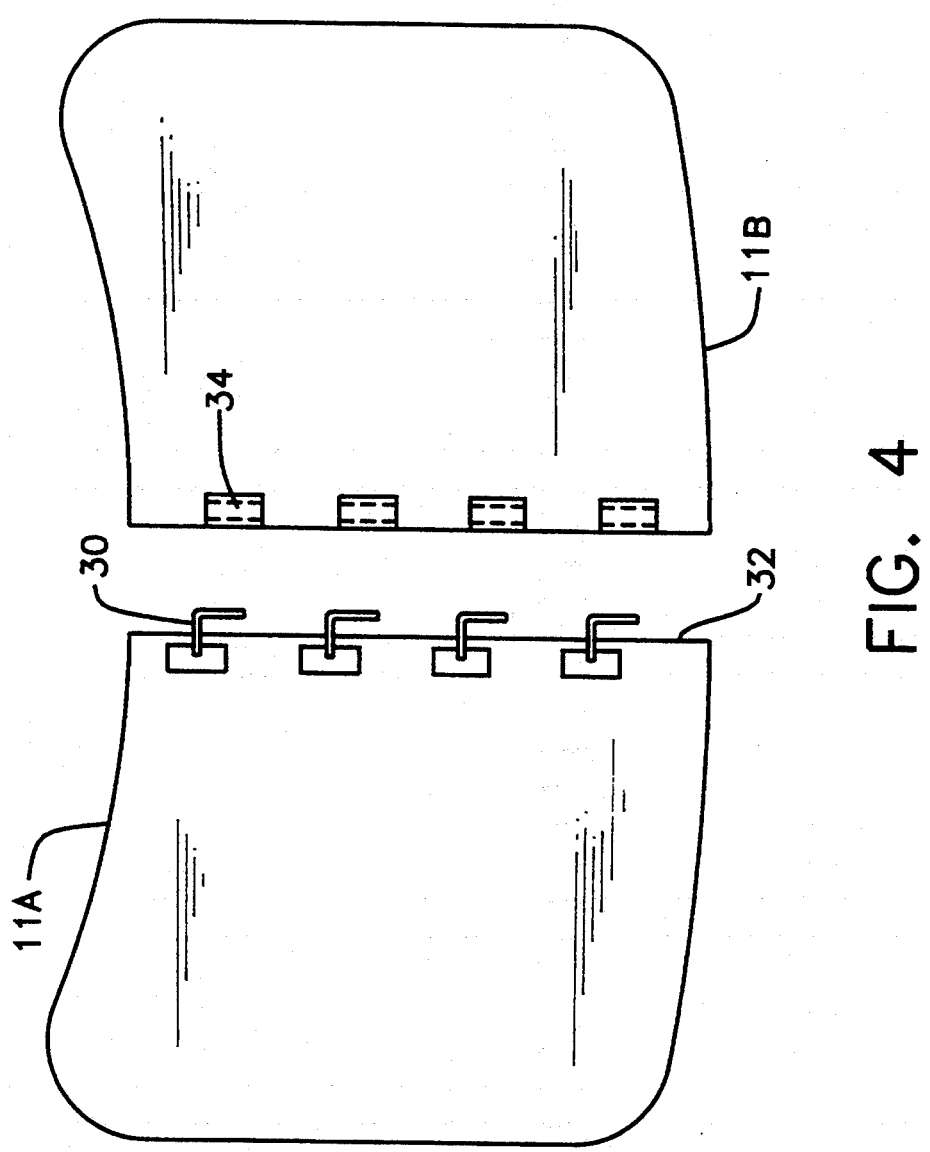
FIG. 4 is a bottom plan view of the stroller tray of FIG. 2.

As shown in FIG. 3, complimentary sections 11A and 11B of collapsible stroller tray 10 are secured by a hinge means at the midpoint where sections 11A and 11B are joined. This hinge means is more evident when considering FIG. 4 which is a bottom exploded view of collapsible stroller tray 10 showing in detail one embodiment of a hinge means. FIG. 4 illustrates complimentary sections 11A and 11B in a nonsecured positioned. In this configuration, section 11A has a plurality of L-shaped fingers 30 extending outwardly from lateral edge 32. Section 11B of collapsible stroller tray 10 has a plurality of corresponding channels 34 positioned along lateral edge 32, channels 34 being dimensioned to slidably receive L-shaped fingers 30 therein. This configuration allows for sections 11A and 11B of collapsible stroller tray 10 to be secured in locking engagement for use on the stroller side rails or to allow sections 11A and 11B to be disengaged for storage. It will, of course, be readily appreciated that the positions of the fingers and channels may be varied and that as few as one finger and channel may be utilized.

Figure 5:
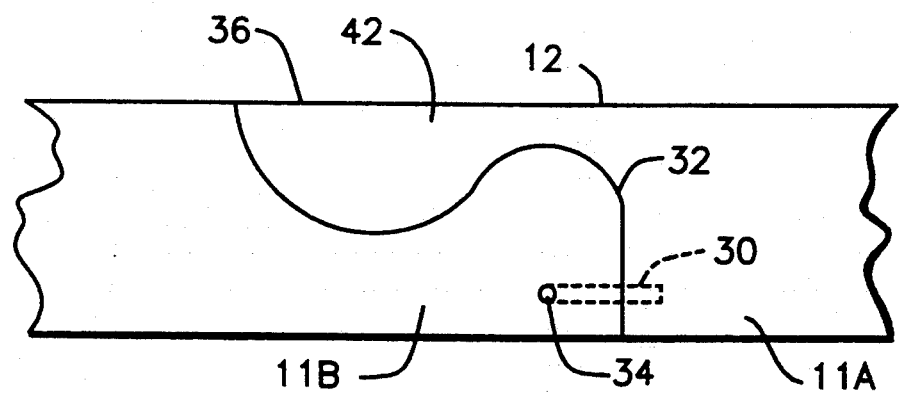
FIG. 5 is a partial sectional view showing the interconnection of the first and second tray sections in accordance with the present invention.

FIG. 5 is a partial enlarged view of one of the plurality of hinging mechanisms illustrating in greater detail the cooperation between section 11A and 11B at one of the plurality of securing points. Section 11B of collapsible stroller tray has an overlapping edge 36 such that when sections 11A and 11B are secured as illustrative in FIG. 3, overlapping edge 36 of section 11B overlaps a portion of section 11A of collapsible stroller tray so as to define a line of demarcation 38 between sections 11A and 11B on upper planar surface 12. This line of demarcation 38 is offset from the line of demarcation 40 as viewed on the bottom plan view of collapsible stroller tray 10 in order to define a tortuous path from upper planar surface 12 to lower planar surface 22 and to thus prevent the possibility that spills occurring on upper planar surface 12 will leak through the collapsible stroller tray 10 and soil or wet the clothing of the child which would be positioned below collapsible stroller 10.

With continuing reference to FIG. 5, it will be seen that section 11A has a shoulder 42 formed along lateral edge 32 proximate to channel 34. Overlapping edge 36 of section 11B is shaped to conform to shoulder 42 of section 11A. Thus, when L-shaped finger 30 is inserted within channel 34 and moved laterally therewithin to engage sections 11A and 11B in alignment, 11A and 11B can then be rotated on L-shaped fingers 30 positioned within channels 34 to snap-fit section 11B over shoulder 42 of section 11A to form upper planar surface 12. This operation provides for a secure fit and provides the tortuous path which prevents liquids form leaking between tray sections 11A and 11B.

Figure 5A:
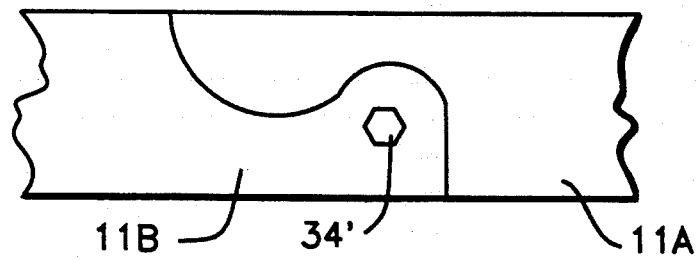
FIG. 5A is a partial sectional view showing the interconnection of the first and second tray sections in accordance with an alternate embodiment of the present invention.

As an alternative means of providing structural stability to collapsible stroller tray 10 and providing a planar upper surface 12, channels 34' and L-shaped fingers (not shown) may be of a non-circular cross-sectional area as shown in FIG. 5A, which is an enlarged view of a second embodiment of a hinging means for collapsible stroller tray 10. In this configuration, channel 34' is polygonal in cross section, taking the form of a triangle, square, hexagon or octagon and the cross-sectional configuration of L-shaped finger corresponds therewith such that when L-shaped fingers are slidably secured within channels 34', the non-circular cross-sectional, rotation of the same is prevented to thereby maintain the structural integrity of sections 11A and 11B in establishing upper planar surface 12.

Figure 6:
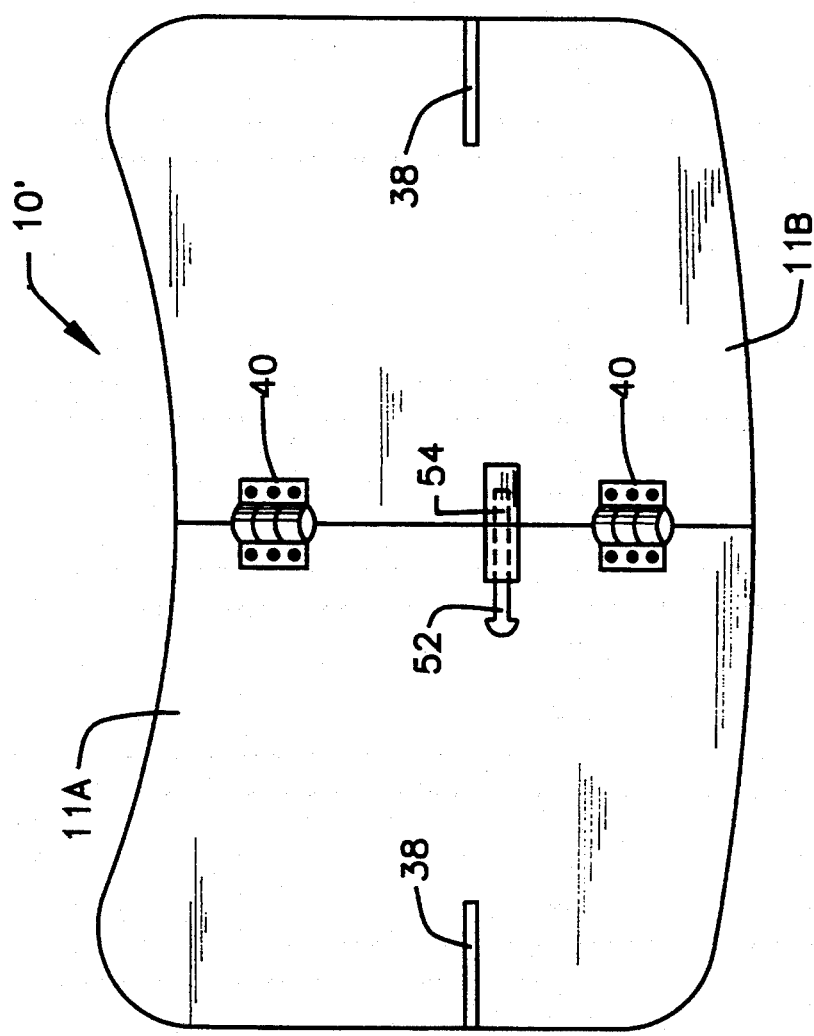
FIG. 6 is a bottom plan view of a further embodiment of the collapsible stroller tray of the present invention.

Another embodiment of the collapsible stroller tray is illustrated in FIG. 6 which is a bottom plan view. In this embodiment, the general shape of the tray 10', including complimentary sections 11A, 11B and platform portion 12 may be essentially the same as with the embodiment depicted in FIGS. 2–5. Additionally, the clamp holders (not shown) are still slidably secured to rails 38 on the bottom surface of the respective tray sections. However, the collapsibility of the tray is accomplished by means of one or more hinges 40 permanently secured to sections 11A and 11B, which hinges permit the rotation of the tray sections between the coplanar position illustrated and a position in which the planar surfaces thereof are parallel. As such, the collapsible tray of this embodiment may be folded for storage when not in use to thereby reduce the size of the stroller tray by half. The structural integrity of platform portion 12 and tray 10 is maintained by means of a locking pin 52 secured to section 11B and slidably engageable with a receiver member 54 positioned on section 11A. This prevents the collapsing of tray 10 while it secured to the stroller.

Of course, it will be readily appreciated by those of ordinary skill in the art that any conventional type of hinge means and locking structure may be relied upon to secure the tray sections together and maintain them in coplanar alignment. Accordingly, while the invention has been described with reference to its preferred embodiment thereof, it will be appreciated by those of ordinary skill in the art that various changes can be made in the apparatus without departing from the basic spirit and scope of the invention.

What is claimed is:

1. A stroller comprising:
   stroller means for collapsing and folding to a compact shape; and
   tray means releasably securable to said stroller means, wherein said tray means includes:
   a tray portion comprising first and second sections, each section defining a substantially planar surface, and hinge means pivotably connecting said sections, said sections being foldable between a first condition in which said substantially planar surfaces are in parallel relationship and a second condition in which said substantially planar surfaces are in coplanar relation;
   fluid trap means for substantially preventing the passage of fluid between said first and second sections of said tray portion, said fluid trap means comprising a pair of complementary S-shaped interlocking surfaces, each one of said pair of S-shaped interlocking surfaces being a unitarily formed portion of one of said first and second sections of said tray portion; and
   coupling means for detachably coupling said first and second sections to said stroller means.

2. A stroller according to claim 1, wherein said stroller means includes first and second side rails and wherein said coupling means comprises first and second clamp holders attached to respective sections of the tray portion, each respective clamp holder being adapted to engage a corresponding one of said side rails and to thereby couple the stroller means to said first and second sections of said tray means.

3. A stroller according to claim 2, wherein said first and second clamp holders are slidably secured to respective sections of said tray sections, each respective clamp holder including positioning means for selectively positioning said holder relative to a first lateral edge of a corresponding tray section, thereby permitting the distance between said clamp holders to be adjusted when said sections are in said second condition.

4. A stroller according to claim 3, wherein said positioning means are dimensioned and arranged such that each respective clamp holder is movable from a first position below a corresponding tray section to a second position beyond a lateral edge of said corresponding tray section.

5. A stroller according to claim 1, wherein said tray means further includes means for locking said first and second tray sections in said second condition.

6. A stroller according to claim 1, wherein said hinge means includes a plurality of L-shaped members positioned along a second lateral edge of said first tray section and a plurality of channels positioned along a second lateral edge of said second tray section, wherein said L-shaped members are insertable into said channels to secure said first and second tray sections in said second condition.

7. A stroller according to claim 1, wherein said stroller means includes first and second side rails, wherein each of said tray sections defines at least one slot and wherein said coupling means comprises strap means insertable into said slots and adapted to encircle said side rails for securing said tray sections thereto.

8. A stroller comprising:
   stroller means for collapsing and folding to a compact shape; and
   tray means releasably securable to said stroller means, wherein said tray means includes:
   a tray portion comprising first and second sections, each defining a substantially planar surface portion, and securing means for interconnecting said tray sections such that said substantially planar surface portions are coplanar;
   fluid trap means for substantially preventing fluid spilled on said tray from passing between said first and second sections of said tray portion, said fluid trap means comprising an S-shaped interlocking surface unitarily formed on each one of said first and second sections of said tray portion; and
   coupling means for detachably coupling said tray portion to said stroller means.

9. A stroller according to claim 8, wherein said securing means includes a plurality of L-shaped members positioned along a second lateral edge of said first tray section and a plurality of channels positioned along a lateral edge of said second tray section, wherein a portion of each L-shaped member is insertable into a corresponding channel.

10. A stroller according to claim 9, wherein said portion of each L-shaped member has a polygonal cross section and wherein said channels have a corresponding polygonal cross section to prevent relative rotational movement of said tray sections when said L-shaped members are inserted therein.

11. A stroller according to claim 8, further comprising a hinge means for pivotably connecting said first and second sections, said sections being foldable between a first position in which said surface portions of said sections are in side by side relationship and a second position in which said surface portions are in substantially coplanar relation.

12. A stroller according to claim 11, wherein said securing means comprises a pin extending from said first section and a receiving member disposed on said second section, said receiving member defining an aperture for receiving said pin in interlocking relation, whereby said first and second sections may be interlocked when said substantially planar surfaces are coplanar.

13. A collapsible tray member detachably securable to a stroller having opposing side rails, comprising:
first and second tray sections, wherein each of said tray sections defines a substantially planar surface portion and first and second lateral edge surfaces;
coupling means for coupling said first and second tray sections to said stroller; and
securing means for interconnecting said tray sections such that said substantially planar surface portions are contiguous and coplanar and the first lateral edge surface of the first tray section contacts the second lateral edge surface of the second tray section, wherein said first and second lateral edge surfaces define a sinusoidal-like path therebetween forming fluid trap means to substantially prevent the passage of fluid therebetween.

14. A collapsible tray member according to claim 13, wherein said coupling means comprises first and second clamp holders attached to respective tray sections, each respective clamp holder being adapted to engage a corresponding one of said side rails and to thereby couple the stroller to said first and second tray sections.

15. A collapsible tray member according to claim 13, wherein said first and second lateral edge surfaces define complementary arcuate surfaces that engage when said first and second tray sections are in said coplanar position, thereby forming said sinusoidal-like path.

16. A collapsible tray member according to claim 15, wherein the first lateral edge of said first tray section defines an upwardly facing, arcuate recess and wherein the first lateral edge of said second tray section defines a downwardly facing arcuate surface dimensioned for seating in said recess.

* * * * *